(12) United States Patent
Verhaverbeke

(10) Patent No.: US 9,739,041 B1
(45) Date of Patent: Aug. 22, 2017

(54) DUAL WATER TANK FOR CITY WATER AND RAIN WATER

(71) Applicant: Steven Verhaverbeke, San Francisco, CA (US)

(72) Inventor: Steven Verhaverbeke, San Francisco, CA (US)

(*) Notice: Subject to any disclaimer, the term of this patent is extended or adjusted under 35 U.S.C. 154(b) by 11 days.

(21) Appl. No.: 14/172,866

(22) Filed: Feb. 4, 2014

Related U.S. Application Data

(60) Provisional application No. 61/760,614, filed on Feb. 4, 2013.

(51) Int. Cl.
*E03D 1/22* (2006.01)
*E03D 5/00* (2006.01)

(52) U.S. Cl.
CPC ............ *E03D 1/22* (2013.01); *E03D 5/006* (2013.01)

(58) Field of Classification Search
CPC ............ E03D 1/22; E03D 5/003; E03D 5/006
USPC ................................................ 4/340, 364, 326
See application file for complete search history.

(56) References Cited

U.S. PATENT DOCUMENTS

| 7,870,868 B1* | 1/2011 | Ilalaole | E03D 5/003 137/357 |
| 8,377,291 B2* | 2/2013 | Eckman | B01D 29/035 210/105 |
| 2002/0157177 A1* | 10/2002 | Sakura | E03D 1/306 4/364 |
| 2010/0107325 A1* | 5/2010 | Lorenz | E03B 3/28 4/363 |

* cited by examiner

*Primary Examiner* — Janie Loeppke
(74) *Attorney, Agent, or Firm* — Donald J. Pagel

(57) ABSTRACT

A flush toilet comprised of a tank having a first compartment for holding a first type of water, and a second compartment for holding a second type of water. The first compartment is separated from the second compartment by a divider that prevents the first type of water from mixing with the second type of water. The first type of water can be city water while the second type of water can be rainwater.

16 Claims, 3 Drawing Sheets

DUAL WATER TANK FOR CITY WATER AND RAIN WATER

This application claims the benefit of U.S. Provisional application 61/760,614, filed Feb. 4, 2013, which is incorporated herein by reference.

BACKGROUND OF THE INVENTION

The most popular form of toilet is a flush toilet. A flush toilet is a toilet that disposes of human waste by using water to flush it through a drainpipe to another location. A typical example of this is a close coupled cistern type of flush toilet illustrated in FIG. 1. A close coupled cistern type of toilet means that the water cistern is closely coupled to the toilet bowl. In FIG. 1, the toilet comprises a toilet bowl 90, a tank 94 and a tank cover 96. The typical tank volume is about 1.6 gallons, but the trend is towards smaller volumes.

The flushing mechanism in typical toilet systems provides a large flow of water into the bowl. The flushing mechanism usually incorporates one or more parts of the following designs: 1. a tank or cistern (i.e. the tank 74); 2. a tank fill valve (i.e. the fill valve 2 in FIG. 2); or 3. a bowl, a loo or a pan, which is the part of the toilet that receives bodily waste (i.e. the toilet bowl 90).

In a tank-based system, the storage tank (or cistern) collects between 6 and 17 liters of water over a period of time. This system is suitable for locations plumbed with ½" (15 mm) or ⅜" (10 mm) water pipes. The storage tank is kept full by a tank fill valve. The storage tank is usually mounted directly upon the bowl (close coupled cistern type), although some tanks are mounted on the wall a few feet above the bowl in an attempt to increase the flush water pressure as it enters the bowl.

FIG. 2 illustrates that in tanks using a flapper flush valve, the outlet at the bottom of the tank is covered by a buoyant plastic cover or flapper 6, which is held in place against a fitting (i.e. the flush valve seat 14) by water pressure. To flush the toilet, the user pushes a lever 8, which lifts the flush valve flapper 6 from the valve seat 14. The valve 6 then floats clear of the seat, allowing the tank to empty quickly into the bowl via a flush tube 12. As the water level in the tank drops, the flush valve flapper 6 falls back to the bottom, stopping the main flow to the flush tube 12.

Because the tank water level has yet to reach the fill line, water continues to flow from the tank 4 and bowl fill tubes 5. When the water again reaches the fill line 10, the float 1 will release the fill valve shaft 11 and water flow will stop. Other components of this system are a fill valve 2, a lift arm 3, an overflow tube 7, a chain 9 and a cistern 14. The float 1 can be a ball type float like in FIG. 2, or it can be another type of float, such as a concentric float 20 shown in FIG. 3.

In most locations, toilets use the potable water supply for supplying the water to the cistern. There is a need to conserve potable water or generally tap water. Toilet flushing does not need to be done with potable water (tap water) and hence there is a need for an alternative supply of water for flushing toilets. The most obvious alternative supply for flushing the toilets is to use captured or harvested rainwater. Rainwater can be captured or harvested from solid surfaces such as roofs and stored in a rainwater holding tank. This water is perfectly fine for flushing toilets. Connecting the rainwater supply to a single toilet is currently being done and is very straightforward. However, rainwater supply is not constant and is not always available. Hence, a reliable backup water supply and an improved system for using the backup water supply are needed for those instances when the rainwater tank is empty.

SUMMARY OF THE PRESENT INVENTION

Briefly, the present invention comprises a system that allows the potable or tap water supply to be conveniently used as a backup source of water for a toilet in situations where a rainwater tank is empty. The system is a flush toilet comprised of a tank having a first compartment for holding a first type of water, and a second compartment for holding a second type of water. The first compartment is separated from the second compartment by a divider that prevents the first type of water from mixing with the second type of water. The first type of water can be city water (e.g. potable or tap water) while the second type of water can be rainwater.

The solution that the present invention provides is the combination of the rainwater supply and the potable water supply in the same toilet. This is desirable because a problem with the prior art is that combining the potable water supply and the rainwater supply in a single toilet is not allowed by building codes. Hence, the prior art solution to the problem is to use two toilets: one toilet with rainwater supply and one toilet with potable water (or tap water or city water) supply.

The problem with the prior art arises from the fact most building codes, in most jurisdictions, do not allow the direct contact of rainwater with potable water without an air break in between. For example, it is allowable to fill a barrel that is half filled with rainwater, to fill that barrel more with a tap water if the hose to fill it up with tap water is raised from the top water level, i.e. if there is an air break between the hose that supplies the tap water and the water level in the barrel.

In the same case, it would not be allowed to have the hose immersed in the barrel when the hose is filling the barrel with tap water and the barrel is half filled with rainwater. This is because in that case, there is a direct hydraulic connection between the rainwater and the city water supply. The only mechanism in that case to prevent the rainwater from seeping into the city water supply is the differential pressure of the city water supply and the pressure of the rainwater in the barrel. However, relying on a pressure differential alone is not allowed by building codes, since there could always be a loss of pressure in the city water supply or a siphoning of water towards the city water supply system, because of loss of pressure. Hence, at all times, there needs to be an additional barrier between the rainwater and the city water.

The use of two completely separated toilets in the prior art solves this issue, but also creates problems. Specifically, if one were to use the rainwater toilet without first checking the adequate availability of rainwater in the rainwater tank, one could end up with a toilet which was just used, but which had no water to flush it. Additionally, it is not very practical in most houses to have two separate toilets in one bathroom: one toilet working with city water and the other toilet working with rainwater.

Hence, there is a clear need for a new invention that can provide a toilet that has two different water supplies, rainwater and tap water, that can be flushed with either one, and that guarantees that there is always an air break between the city water supply and the rainwater; or stated differently, that there is never a direct path connecting the rainwater to the city water without any air break. Additionally, the toilet should be operable in such a way that the user does not need to check in advance for the availability of rainwater supply.

DETAILED DESCRIPTION OF THE INVENTION

The current invention describes a novel toilet tank (or water cistern) that can receive water from both a city water supply and also from a rainwater supply. In the novel toilet tank of the present invention, there is no direct connection between the rainwater and the city water supply without an air break. Additionally, the user can choose between two different water supply sources, and the city water supply source is always available in case the rainwater supply has run dry.

Figure 4:
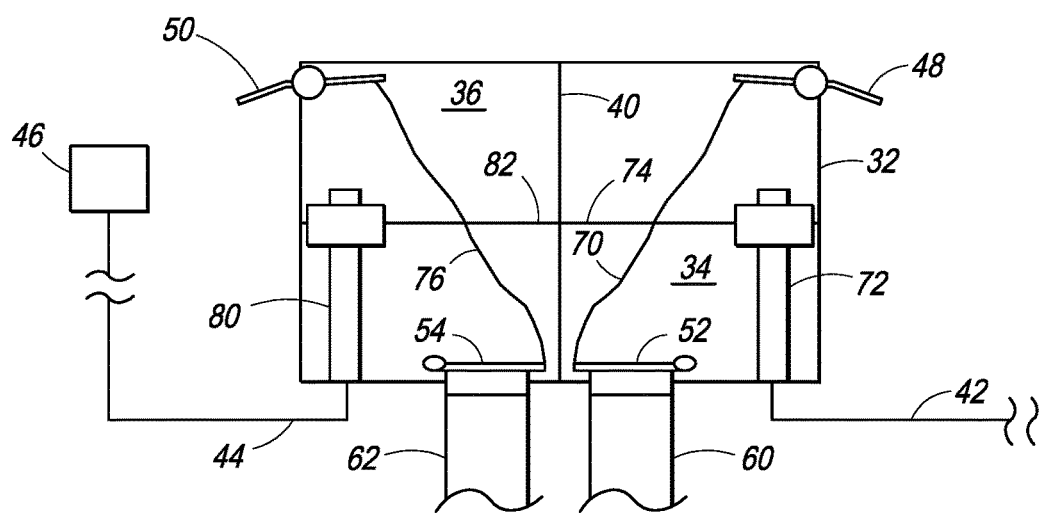
FIG. 4 is a schematic view of a dual chamber water tank according to the present invention.

FIG. 4 illustrates that the present invention comprises a toilet tank 32 having a first compartment (or chamber) 34 and a second compartment (or chamber) 36. A divider plate 40 separates the compartment 34 from the compartment 36 so that there can be no mixing or contact of water held in the compartment 34 with water held in the compartment 36.

The key point of the novel tank 32 is that it is a tank with two compartments separated by the divider plate 40. Each compartment of the tank is not hydraulically in communication with the other tank. The volume of each compartment may be, for example, 1.6 gallons, so that the total volume of this tank may be 3.2 gallons. In order to keep the footprint of the tank similar to a standard tank for city water supply, the novel tank of this invention with two compartments may be higher (taller) than a standard tank for city water supply only.

One of the compartments of the novel tank is connected to a first water supply, such as the city water supply, by a first line 42. The other compartment is connected to a second water supply, such as a rain water supply, by a second line 44. The city water supply is usually pressurized and fed typically with e.g. a ⅜" copper line, although any other connection is possible as well. As used here, the term city water supply means a sanitary water supply, such as tap water or some other form of potable water, generally available throughout a city or other location. The rainwater is usually supplied by gravity from a storage tank 46, such as a rainwater harvesting tank, and is usually supplied by a large diameter e.g. 1½" PVC pipe, and is typically non-pressurized, although other connections are possible as well.

Figure 1:
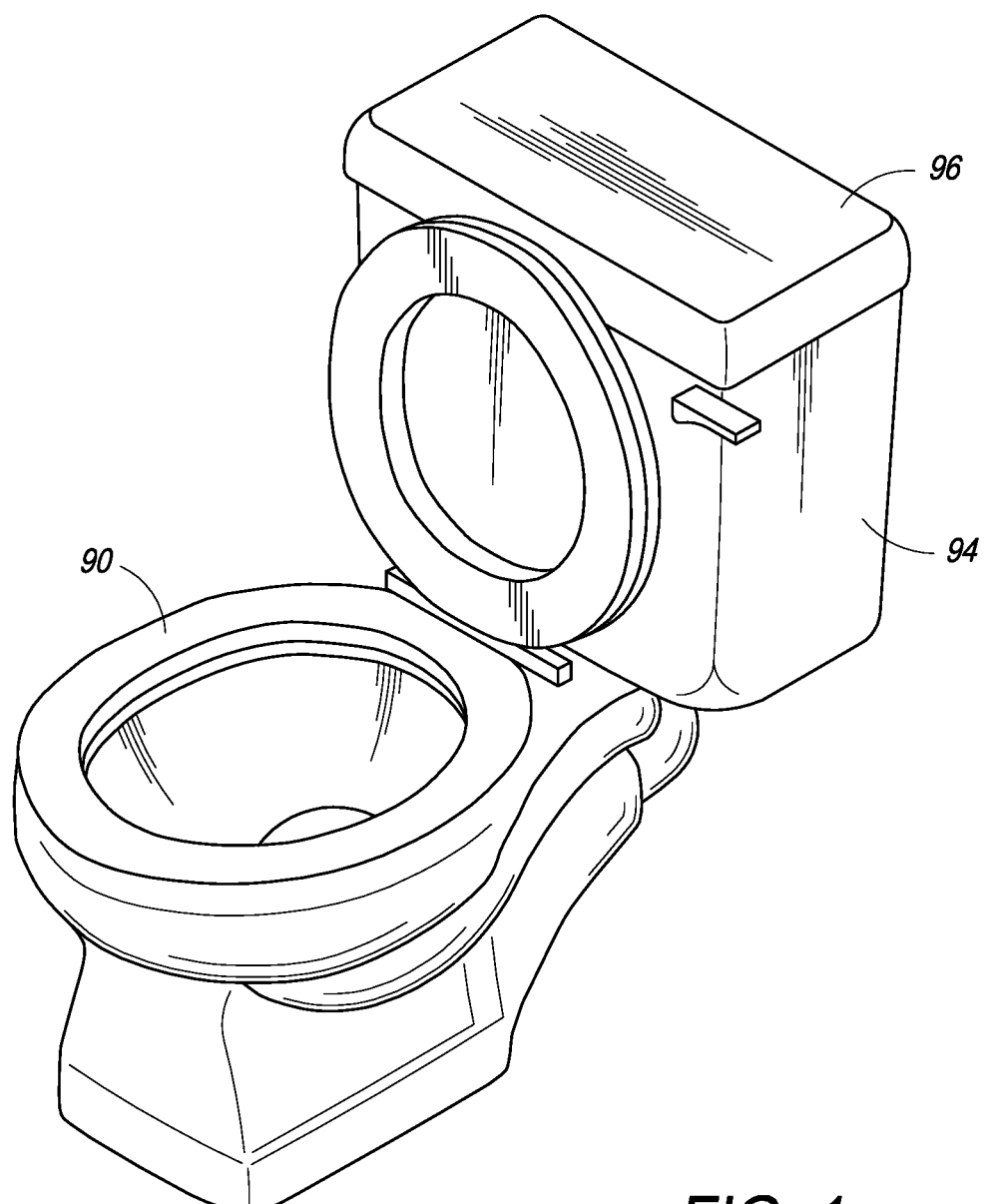
FIG. 1 shows a prior art flush toilet.

Each compartment has its own manual handle 48 and 50 to open the flappers 52 and 54, respectively, in order to allow the tank water to flow to a toilet bowl, such as the bowl 90 shown in FIG. 1, via a first flush tube 60 and a second flush tube 62. In FIG. 4, the first flush tube 60 and a second flush tube 62 each connect separately to the toilet bowl.

At all times there is an air break between the rainwater and the city water. The tank can sit on a toilet bowl with two different inlets for the tank water. However, the rain water (or other second water supply) can also be fed with a pump from the storage tank 46.

Figure 5:
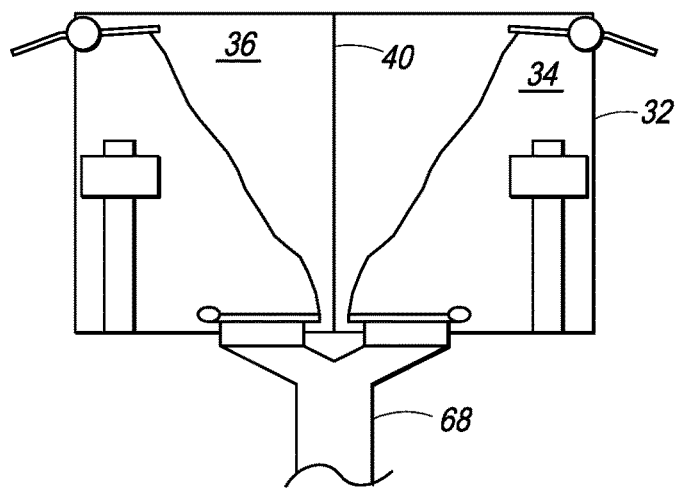
FIG. 5 is a schematic view of another embodiment of a dual chamber water tank according to the present invention.

In an alternative embodiment, the two flush tubes 60 and 62 from FIG. 4 can be combined into one flush tube and made such that they fit on a standard flush opening going to an existing standard toilet bowl 90. This situation is shown in FIG. 5 where a Y-shaped flush tube 68 replaces the individual flush tube 60 and 62.

Figure 2:
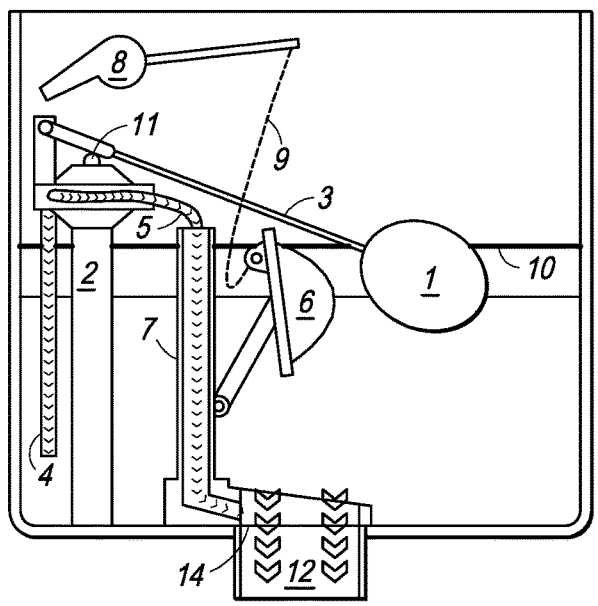
FIG. 2 is a schematic view of the components inside the tank of a prior art toilet.
Figure 3:
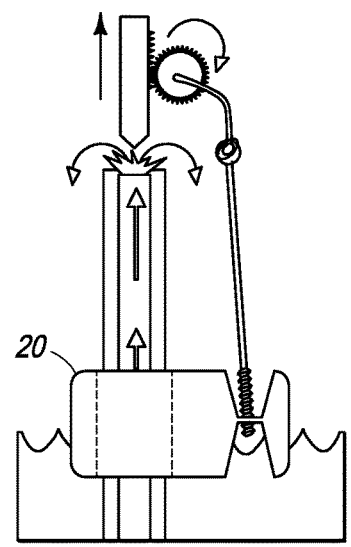
FIG. 3 illustrates a prior art concentric float.

In FIG. 4, the compartment 34 also includes a first chain 70 for connecting the handle 48 to the flapper 52, and a first fill valve 72 for filling the compartment 34 with water when the compartment is empty and shutting off the water when the water level reaches a fill line 74. Similarly, the compartment 36 also includes a second chain 76 for connecting the handle 50 to the flapper 54, and a second fill valve 80 for filling the compartment 36 with water when the compartment is empty and shutting off the water when the water level reaches a fill line 82. The first and second fill valves can be any type of commercially available toilet tank fill valves, such as the fill valve 2 that operates with the float 1 illustrated in FIG. 2 or with the concentric float 20 shown in FIG. 3.

The tank 32 of the present invention can be fitted to a standard existing toilet bowl 90. The tank 32 can be made out of various materials such as plastic or polymeric materials, but also ceramic materials. The fitting of the tank on the toilet bowl would need a sealing to avoid any leaks. This is standard practice with current tank-bowls.

Furthermore, the tank 32 can also be made together with the toilet bowl 90 in one part, becoming an integrated tank-bowl toilet. Additionally, there could be a writing in letters or in symbols on the thank indicating to the user which side is for the first water supply (e.g. the city water supply) and which side is for the second water supply (e.g. the rain water supply).

The user would simply use the toilet without checking the water supply. After using the toilet, the user would flush the toilet with the rainwater side of the tank indicated on the tank by words or by a symbol. The user would then get immediate visual feedback on whether there is rainwater available or not. If there is no rainwater available, there would be no or inadequate water flushing in the toilet. If the user then notices that no rainwater is flushing in the toilet, he would simply flush the toilet with the city water side of the toilet.

There could also be a small window in the tank 32 to give external feedback to the user which side of the tank is filled, but this is an optional, not a necessary feature. The lid of the tank would normally be simple removable as it would sit on the tank by gravity only. This is now also customary in standard toilet tanks for city water only. The user can then always simply lift the lid to inspect the tank for available water. The lid could be one lid for the tank with the two compartments or there could be two lids for each compartment separately.

Periodically the chain connecting the handle and the flapper may have fallen of the handle. This is now also the case with current toilet tanks with city water only and is simply handled by lifting the lid and checking for it. This would happen repeatedly if the rainwater side is empty or otherwise if it had rained recently and the user didn't expect the rainwater to be empty.

Furthermore, during the flushing of the toilet, there is usually a provision to fill not only the tank with fresh water, but during the filling of the tank, there is usually also a provision to fill the bowl to make sure that the bowl is not empty due to the siphoning of the water that occurred during the flush. This is no different from the current standard city water toilets. However, the filling of the bowl mechanism may have to be adapted to the low pressure of the rain water source as compared to the high pressure of the city water.

Finally, there could be a shutoff valve on the city water supply side and a shutoff valve on the rain water supply side to isolate the toilet and toilet tank from both supplies. The shutoff valve on the city water supply side could be a standard manually operated ⅜ inch brass valve. The shutoff valve on the rainwater supply side could be a much larger 1.5 inch PVC valve.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true scope of the invention.

I claim:

1. A flush toilet comprising:
   a tank;
   a first compartment in the tank for holding a first type of water consisting of city water, the first compartment including a first fill valve and a first flapper, with the first fill valve being comprised of a float and being configured to control the filling of the first compartment with the first type of water, the first flapper allowing the first type of water to drain from the first compartment and into a toilet bowl when the first flapper is raised;
   a second compartment in the tank for holding a second type of water consisting of rainwater, with the second compartment being separated from the first compartment by a divider plate that prevents the second type of water from mixing with the first type of water, the second compartment including a second fill valve and a second flapper, with the second fill valve being comprised of a float and being configured to control the filling of the second compartment with the second type of water, the second flapper allowing the second type of water to drain from the second compartment into the toilet bowl when the second flapper is raised;
   a first pipe having a first diameter for connecting the first compartment to a city water supply; and
   a second pipe having a second diameter for connecting the second compartment to a rainwater supply, with the second diameter being larger than the first diameter.

2. The flush toilet of claim 1 further comprising:
   a first shutoff valve having the first diameter of the first pipe for shutting off the first type of water to the first compartment; and
   a second shutoff valve having the second diameter of the second pipe for shutting off the second type of water to the second compartment.

3. The flush toilet of claim 1 further comprising an indicator on the tank for indicating which side of the tank holds the first type of water and which side of the tank holds the second type of water.

4. The flush toilet of claim 1 further comprising:
   a first flush passage which allows the first type of water to flow from the first compartment into the toilet bowl; and
   a second flush passage which allows the second type of water to flow from the second compartment into the toilet bowl.

5. The flush toilet of claim 4 wherein the first flush passage is connected to the second flush passage.

6. The flush toilet of claim 1 further comprising:
   a toilet bowl, with the tank and the toilet bowl being integrated into a single integrated tank-bowl toilet structure.

7. The flush toilet of claim 1 wherein the first diameter is ⅜ of an inch.

8. The flush toilet of claim 1 wherein the rainwater is gravity fed to the second compartment through the second pipe.

9. The flush toilet of claim 1 further comprising a window positioned in the tank for allowing the water level of the rainwater in the second compartment to be observed.

10. The flush toilet of claim 1 wherein the tank comprises a material selected from the group consisting of plastic and ceramic.

11. The flush toilet of claim 1 further comprising:
    a first handle on the outside of the first compartment in communication with the first flapper; and
    a second handle on the outside of the second compartment in communication with the second flapper.

12. The flush toilet of claim 1 wherein the first pipe comprises a copper pipe having a ⅜ inch diameter and the second pipe comprises a polyvinylchloride (PVC) pipe having a diameter of 1.5 inches.

13. The flush toilet of claim 1 wherein the first compartment and the second compartment are each sized to hold a volume of 1.6 gallons of water.

14. The flush toilet of claim 1 further comprising:
    a rainwater storage tank for supplying the rainwater to the second compartment.

15. A flush toilet comprising:
    a tank;
    a toilet bowl underneath the tank;
    a first compartment in the tank for holding a first type of water consisting of city water, the first compartment including a first fill valve and a first flapper, with the first fill valve being comprised of a float and being configured to control the filling of the first compartment with the first type of water, the first flapper allowing the first type of water to drain from the first compartment and into the toilet bowl when the first flapper is raised;
    a second compartment in the tank for holding a second type of water consisting of rainwater, with the second compartment being separated from the first compartment by a divider plate that prevents the second type of water from mixing with the first type of water, the second compartment including a second fill valve and a second flapper, with the second fill valve being comprised of a float and being configured to control the filling of the second compartment with the second type of water, the second flapper allowing the second type of water to drain from the second compartment into the toilet bowl when the second flapper is raised;
    a rainwater storage tank for supplying the rainwater to the second compartment;
    a first pipe having a first diameter for connecting a city water supply to the first compartment; and
    a second pipe having a second diameter for connecting the rainwater storage tank to the second compartment, with the second diameter being larger than the first diameter.

16. The flush toilet of claim 15 wherein the first compartment and the second compartment are each sized to hold a volume of 1.6 gallons of water.

* * * * *